US011379268B1

(12) United States Patent
Gupta

(10) Patent No.: US 11,379,268 B1
(45) Date of Patent: Jul. 5, 2022

(54) AFFINITY-BASED ROUTING AND EXECUTION FOR WORKFLOW SERVICE

(71) Applicant: Amazon Technologies, Inc., Seattle, WA (US)

(72) Inventor: Kuldeep Gupta, Uttar Pradesh (IN)

(73) Assignee: Amazon Technologies, Inc., Seattle, WA (US)

(*) Notice: Subject to any disclaimer, the term of this patent is extended or adjusted under 35 U.S.C. 154(b) by 173 days.

(21) Appl. No.: 16/446,233

(22) Filed: Jun. 19, 2019

(51) Int. Cl.
*G06F 9/46* (2006.01)
*G06F 9/50* (2006.01)
*G06N 20/00* (2019.01)
*G06F 9/48* (2006.01)
*G06K 9/62* (2022.01)

(52) U.S. Cl.
CPC ............ *G06F 9/5033* (2013.01); *G06F 9/485* (2013.01); *G06F 9/4881* (2013.01); *G06F 9/5038* (2013.01); *G06K 9/6256* (2013.01); *G06N 20/00* (2019.01)

(58) Field of Classification Search
CPC ........ G06F 9/5033; G06F 9/485; G06N 20/00
See application file for complete search history.

(56) References Cited

U.S. PATENT DOCUMENTS

| | | | |
|---|---|---|---|
| 6,587,866 B1* | 7/2003 | Modi | H04L 29/06 709/226 |
| 8,504,400 B2 | 8/2013 | Purcell et al. | |
| 9,397,884 B2 | 7/2016 | Chatterjee et al. | |
| 2004/0218535 A1* | 11/2004 | Liong | H04L 45/50 370/238 |
| 2010/0153949 A1* | 6/2010 | Vincent | G06F 9/4843 718/1 |
| 2014/0137182 A1* | 5/2014 | Elzur | H04L 29/06 726/1 |
| 2016/0212007 A1* | 7/2016 | Alatorre | H04L 41/04 |

* cited by examiner

*Primary Examiner* — Camquy Truong
(74) *Attorney, Agent, or Firm* — Robert C. Kowert; Kowert, Hood, Munyon, Rankin & Goetzel, P.C.

(57) ABSTRACT

A workflow service implements policies to leverage affinities to improve system performance. Example types of policies include a parent activity affinity (e.g., data for a task already exists locally to a node), a resource group affinity (e.g., a task requires a particular type of resource capability), or a code affinity (e.g., necessary code for the task is already stored locally to a node). A node for a particular task is selected based on an affinity policy or policy statement (e.g., the type indicated in a policy of a workflow definition) and configuration information, and the task routed to the selected node.

20 Claims, 9 Drawing Sheets

AFFINITY-BASED ROUTING AND EXECUTION FOR WORKFLOW SERVICE

BACKGROUND

Service providers, and provider networks in general, often allow customers to specify a workflow that accomplishes a set of computational tasks to solve a given computational problem, logistical problem, or generally any process that may be directed by a computer system.

Traditional approaches of routing and executing workflow tasks may be inefficient at least because traditional approaches can cause the same data or code to be repeatedly sent over a network (increasing latency of job completion) and/or the same data or code to be repeatedly stored across multiple locations (inefficient use of resources). Also, traditional approaches may allow each of multiple respective tasks to tie up respective different instances of specialized hardware, or may execute a task across distinct instances of hardware that are unnecessarily distant from one another.

Traditional networks running a workflow service generally run a fleet of homogenous nodes. Even if the fleet is not entirely homogenous, traditional systems do not provide a way to specify resource-type preferences at workflow definition creation time.

In traditional systems, some tasks of a workflow can only run on a particular type of resource. In those systems, those tasks must run on the particular type of resource because it cannot run on others.

Figure 1:
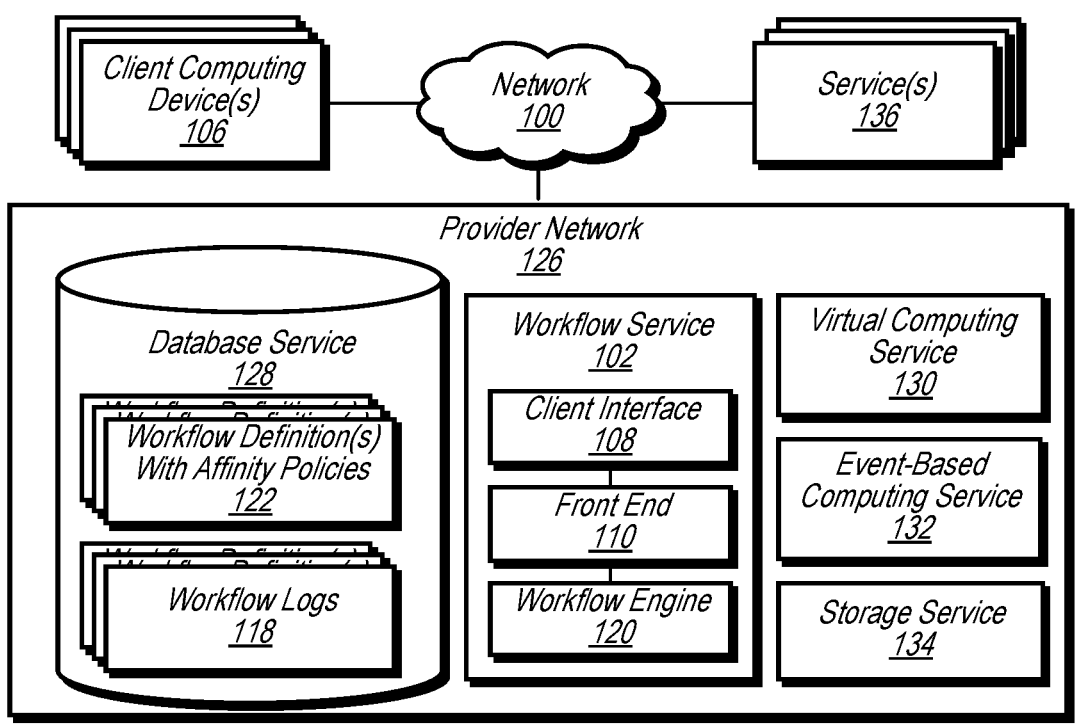
FIG. 1 is an illustrative architecture depicting an example workflow service within the context of a provider network, according to some implementations.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean inclusive of, but not limited to.

DETAILED DESCRIPTION

The systems and techniques described in this disclosure specify implementations of a workflow service for providing improved routing and execution of workflow tasks, using affinity-based policies.

Various types of example affinity policies are disclosed. A non-exhaustive list of example affinity policies includes data affinity policies, code affinity policies, intermediate cache affinity policies, and resource affinity policies. Data affinity may indicate that required data for a workflow task may be present in a particular target compute instance. Code affinity may indicate that required code for a workflow task may be present in a particular target compute instance. Intermediate cache affinity may indicate that required data or code required for a workflow task may be present in an intermediate cache (e.g., near-to, outside or, or otherwise associated with a cluster of nodes, or the like). Resource affinity may indicate that a specific type of compute instance hardware may be required for a workflow task, even though the task is able to run on different types of resources within the fleet of nodes. For instance, a service provider may provide a fleet of nodes, groups of which provide varying functionality (e.g., graphics specialization, or other capability-based groups, etc.) any one of which can run the task. Affinity policies may be implemented to specify which type of resource is preferred. Other types of affinity policies based on other types of affinities are contemplated without departing from the scope of this disclosure. In embodiments, a task may be associated with one or more affinity policies. An affinity policy includes a list of affinities (sometimes referred to as affinity statements, herein). An affinity policy preference may be expressed as an affinity statement within a policy, in some instances. An affinity statement may express or specify multiple types of affinities (e.g., both data and code affinity in one statement).

In embodiments described herein, the workflow service implements technical features to specify resource-type preferences (e.g., static or dynamic resources) at workflow definition creation time, via affinity policy preferences specified in affinity policies, for example.

In some embodiments described herein, while tasks of a workflow can be executed my any of multiple different types of resources (e.g., different types of nodes) some types of resources are preferred, and those preferences can be specified by the system (e.g., via specification in an affinity policy at workflow definition creation time).

For example, in some embodiments, a workflow service provides provisions to specify a priority list containing affinity policy statements for workflow tasks where each list item is a combination of granular data, code, and resource affinity. At run-time, the workflow service may derive a preferred target compute instance after executing the predefined affinity policy preferences of the policy from the priority list at the workflow task level.

In some embodiments, an implementation of the improved workflow service disclosed herein hosts the following compute components as part of a workflow service and targets compute instances for the execution of the disclosed affinity policies—
  a) Affinity-Based Task Router—E.g., A compute component that may be responsible for routing a workflow task to a target compute instance based on a pre-defined priority list of affinity policy statements for workflow tasks. In some embodiments, in order to execute affinity policy statements, the task router leverages information (code, data, and/or resources) from an execution node tracker and a workflow state tracker (e.g., tracks workflow execution history). Some such information may be provided by other components of the workflow service for executing granular code affinity, data affinity, or resource affinity.
  b) Execution Node Tracker—E.g., A compute component that may cache one or both of code and data related to previously executed tasks. This component may also keep the hardware information of target compute instances, in embodiments.
  c) Workflow State Tracker—E.g., A compute component that may track the state of a workflow of tasks.

Workflow Services

A workflow service may include a workflow engine that acts as a fully-managed state tracker and activity task coordinator. In some embodiments, by maintaining the execution state of the job and passing required data between activities, such a workflow engine may enable these activities to become stateless, and well as enable horizontal scaling. However, when the data to be passed between activities becomes large or is classified sensitive, then a durable, available, reliable and secure storage is used to store this data, and keys are passed between activities rather than the actual data, in some embodiments. In these cases, activities interact with the storage for fetching or storing the required data. Such features may facilitate scaling, but the execution of these activities in this manner may incur additional latency since every activity may need to fetch or store the required data over the network every time. Additionally, it may be desirable to run certain activities on certain types of compute instances for the accelerated performance. For example—GPU resources may be needed to accelerate the performance of the activities which are using image processing techniques.

Example Jobs

In some embodiments, an example job could be represented as a workflow having multiple sequential and parallel activities, wherein multiple activities would operate upon either original data or activity data obtained from the execution of previous activities. This activity data could be files in various formats—such as PDFs, images, etc. The file size may vary from few KBs to few MBs. Varying size and sensitivity of the data may require that for these activities to run in a distributed manner, then each activity may need to interact with the storage for fetching and storing data. The multiple repeated interactions with the storage over the network by each activity may increase the latency of the job completion.

In another example, activities may use various image processing techniques and machine learning techniques which benefit from being run on compute instances that provide accelerated computing.

Example Workflow System

Figure 2:
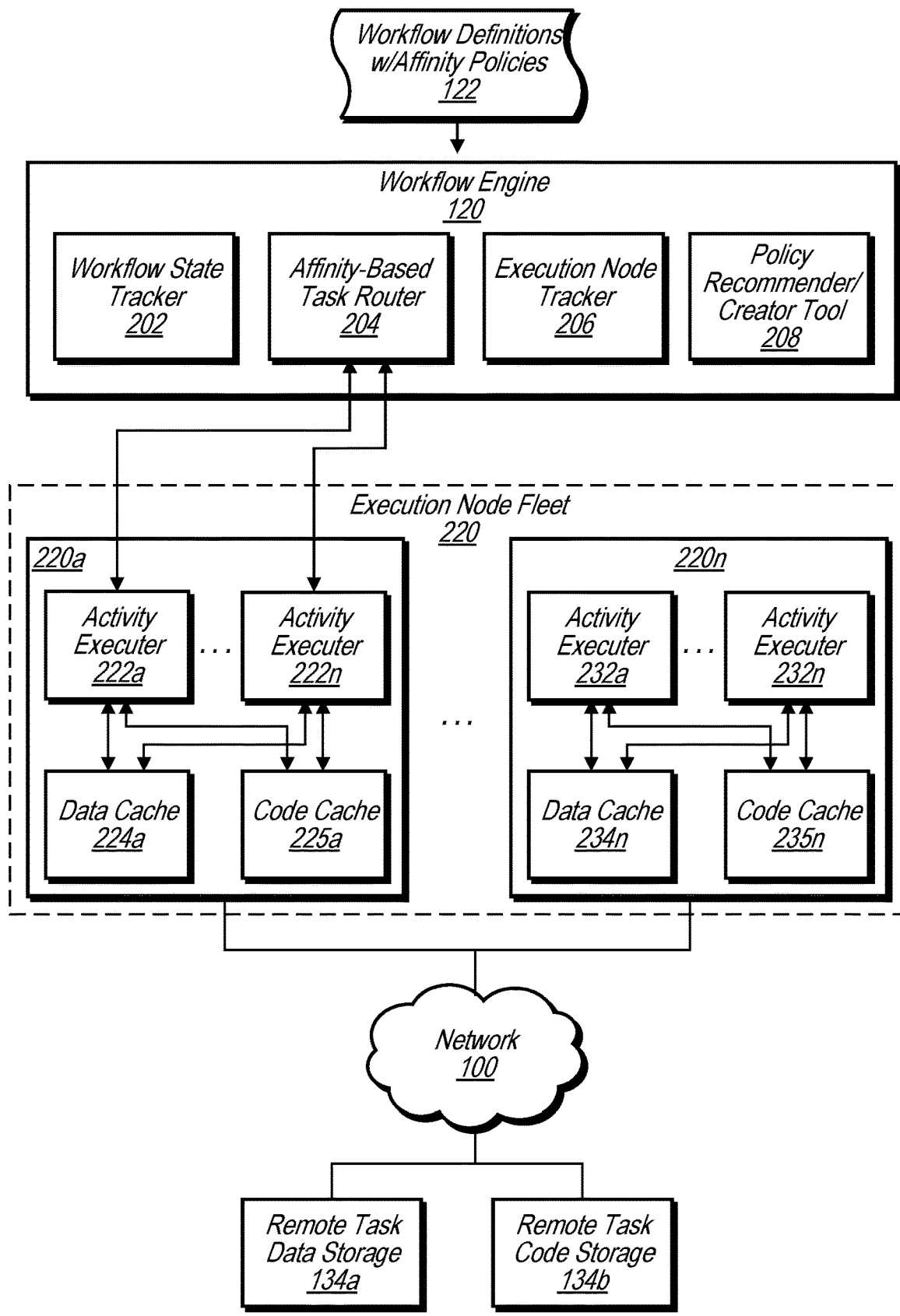
FIG. 2 is an illustrative architecture depicting an example workflow engine within the context of a fleet of execution nodes, according to some implementations.

FIG. 1 illustrates an example workflow service in the context of a service provider network. FIG. 2 is an illustrative architecture depicting an example workflow engine within the context of a fleet of execution nodes, according to some implementations. FIGS. 1 and 2 are discussed below, together, as appropriate for disclosing various possible embodiments and implementation of example alternatives. Generally, various components of FIGS. 1 and 2 may perform various functionality illustrated in FIGS. 3-5, described below, for example.

In embodiments, a workflow may represent an application whose components are connected together to form a graph. The components may represent a sequence of steps required to perform a specific job. The steps need not be strictly sequential; the steps could be run in parallel, depending upon the workflow topology, for example.

In an example system, the workflow service, workflow service 102, may provide a client interface 108 and a front end 110, where the client interface 108 provides a mechanism for the creation and registration of a workflow definition for a workflow. Further, in some cases, the front end may validate a workflow definition (e.g., 122), and if the workflow definition is valid, then the front end 110 may provide the workflow definition (e.g., 122) to a workflow engine 120 to begin executing the workflow. In some cases, the workflow definition (e.g., 122) may be defined as a state machine, where given states of the state machine specify one or more tasks to be performed for the state, and a transition to other states of the state machine. In this way, as progress is made through different states of the state machine, different tasks corresponding to the workflow are executed. Further, one workflow definition may be used to create any number of workflow threads. For example, if the workflow definition is for a workflow for processing online orders for items to be fulfilled, then the same workflow definition may be used in creating a workflow for each given item ordered.

Continuing with this example, the workflow engine 120 may begin execution of the workflow corresponding to the workflow definition. For example, the workflow engine 120 may receive an indication from the front end 110 to begin execution of the workflow, and in response, the workflow engine may determine a next task to schedule for the workflow. Functionality within the workflow engine may be non-blocking, which allows the workflow engine to continue to receive indications to advance other workflows without waiting for responses. Further, the workflow engine may produce a log 118 of completed tasks related to the workflow. As noted above, a single workflow definition may correspond to multiple, different workflows, and in such cases, the workflow engine may maintain a respective workflow log 118 for each respective workflow.

The workflow engine may also log or record an indication of the event within a workflow log 118 corresponding to the workflow. In this example, the workflow engine may record an indication that the workflow was requested to begin executing or record an indication that a task for the workflow has completed. In other cases, the event may indicate a task failure, or some other status information related to the workflow, and the workflow engine may record any and all information with regard to the workflow. Further, in some cases, the workflow engine may log each recording of information with a sequence number or timestamp so that an order may be determined with regard to the logged information.

Further, the workflow engine may log or record the workflow decision so that a subsequent process may determine a current state for the state machine corresponding to the workflow in order to determine a next workflow decision.

As depicted, workflow logs 118 may be stored in workflow log storage of a database service 128. The workflow logs may be stored anywhere, in highly-available, reliable, durable, and scalable, remote, data storage service 134, for example. Choice of storage may vary depending upon the classification of the activity data and whether a storage meets or provides provisions for adhering to data handling technical requirements.

In this example, the workflow service is implemented within provider network 126 and one or more clients, through one or more respective client computing devices 106 may access client interface 108 of the workflow service using network 100.

As discussed above, a client interface may provide a mechanism for the specification of a workflow definition (and specification of affinity policies and affinity policy preferences). In some examples, the workflow specification may be specified in a development environment providing tools for using a programming language with domain specific language features for defining workflows. In some embodiments, such a domain specific language may include language features for specifying workflow states, workflow tasks, including serial or parallel tasks, workflow state transitions, workflow error handling, and affinity policies and affinity policy statements, among other features. In some examples, the development environment may also include tools for specifying some or all features of a workflow and corresponding affinity policies using graphical tools.

In some examples, the client interface may be provided through a website. In other cases, the client interface may provide an application programming interface for interfacing with a client-side application such as a development kit installation.

As depicted, the client interface may communicate with front end 110 of the workflow service 102, where the front end may validate the workflow definition (and/or corresponding affinity policies) and then register the workflow or indicate to the client computing device that a workflow definition (and/or corresponding affinity policies) failed to validate. While front end 110 and client interface 108 are depicted as separate for the purposes of clarity, the logical functionality of front end 110 and client interface 108 may be combined in different embodiments.

As depicted, workflow service 102 may also include workflow engine 120, which may itself include workflow state tracker 202, affinity-based task router 204, execution node tracker 206, and affinity policy recommendation/creator tool 208. In embodiments, the logical functionality of a workflow engine 120 is to execute workflow logic. The workflow engine may also act as a fully-managed state tracker and activity coordinator. For example, the workflow engine 120 may assign activities to activity executors (e.g., 222a-n). An activity may be assigned to an activity executor based on it's corresponding affinity policy preferences (e.g., policy statements specified within the corresponding policy). In some instances, one affinity policy statement could have a combination of code, data, and resource affinities (a combination of distinct types of affinities). It is contemplated that implementation and execution of affinity policies and affinity policy preferences stated within the policies may vary based upon the type of workflow engine.

In some embodiments, the logical function of a workflow state tracker 202 is to track the state of the workflow (described above). For instance, for the workflow being initiated, a workflow state tracker 202 of the workflow engine 120 may construct a state machine for the workflow and determine a current state of the state machine. In this example, after evaluation the current state, the workflow state tracker 202 may determine a next workflow decision and determine a corresponding task for the workflow decision and schedule the task for execution.

In some embodiments, the logical functionality of an affinity policy recommendation/creator tool 208 is to recommend or create affinity policies. For instance, for a given work flow definition, the affinity policy recommendation/creator tool 208 may identify that a task uses data from another task and create an ancestor (e.g., parent policy) for the task. In another example, the policy recommendation/creator tool 208 may create an affinity policy based on the type of task. For instance, the tool may rely upon application of machine learning techniques (e.g., monitor tasks and loads to gather data and use the gathered data to train a model that is used to determine the policy or policy statements) or recognize memory-intensive computations (e.g., recommend certain types of nodes that would perform the memory-intensive computations more quickly) in order to recommend or create an affinity policy and/or policy statements.

In some embodiments, the logical functionality of an execution node tracker 206 is to track the nodes that are executing tasks or activities. For example, an execution node tracker may track (e.g., determine and store) a task code id that is matched to a particular node. In some embodiments, the execution node tracker may determine the node corresponding to the task code id based on where the activity that used the task code id was last executed. In some embodiments, the activity executors transmit the task code id for which the executor is executing to the execution node tracker. In some embodiments, the execution node tracker may track resource capability of nodes of the fleet (e.g., so that resource affinity policies can be applied). For example, additions or deletions of various types of resources to the fleet may be obtained or determined (e.g., via notices) and tracked in a database.

Activity Executor

In some embodiments, the logical functionality of activity executor 222a-n is to execute an activity. In embodiments, an activity may be a component of an application with is represented as a node in the workflow that performs some task. For example, an activity may represent a step, task or single unit of work in a workflow. The logical functionality of an activity executor may include polling (e.g., pull or push) for an activity from the workflow engine for the activity executor to execute. The logical functionality of an activity executor 222a-n may include, upon receiving an activity, fetching the necessary container to execute that activity (e.g., leveraging code locality, as described herein). In embodiments, the container is a method of operating system virtualization that allows a node to run an activity and corresponding dependencies in a sand-boxed and resource-isolated process. In embodiments, containers are launched and executed in a compute instance. Compute instance types may comprise varying combinations of CPU, memory, storage, networking capacity, and special resources—GPU, FPGA, etc. In embodiments, the container is executed in a secure sandbox. This can have several advantages—isolation of crashes, isolation of security, independent scaling, improved development and deployment velocity, etc. Once the container finishes execution, it may pass the response back to the activity executor.

Task Router

In some embodiments, the logical functionality of an affinity-based task router 204 is to route the tasks (e.g., FIG. 3, described below) based on the affinity policies associated with the tasks. The task router 204 may receive indications to either begin a workflow or to advance a workflow. For example, when a workflow is initially validated, the front end may indicate to the task router 204 to begin execution of the workflow. In other cases, the workflow may have already been started, and the front end may provide to the execution node tracker an indication that a task corresponding to a given workflow has completed, and consequently, that a decision is to be made with regard to a next task to execute for the workflow.

As discussed above, to advance execution of a workflow, the workflow state tracker may make decisions for the workflow. In some cases, in order to make a decision for the workflow, the workflow state tracker 202 may access a workflow definition 122 for the workflow. As depicted, workflow definitions 122 may be stored in workflow definition storage 122. Workflow definitions and policies could be stored anywhere, in remote, durable storage service 134, for example.

Further in this implementation, the workflow service 102 may be one of multiple different services provided within a provider network, such as provider network 126. As depicted, other services may include database service 128, virtual computing service 130, event-based computing service 132, and remote durable storage service 134, among others. Further, in some embodiments, a database service, such as database service 128, may implement workflow definition storage 122 and/or workflow log storage 118. More generally, any of the storage services used by the workflow service may be provided by either local storage, a storage service, or a combination of local storage and storage services. Local in-memory cache may include compute-instance specific local in-memory cache, for instance.

In some embodiments, a workflow may be specified to use services provided entirely within provider network 126. However, in other examples, a workflow may be specified to use one or more services provided from a third party, for example, services 136. In some cases, a combination of provider network services and third-party services may be used in the execution of a given workflow.

In this way, beginning with a client system specifying a workflow, a workflow service may begin executing the workflow in a manner that provides continuous workflow processing using multiple, discrete deployments of computation resources in a manner that leverage various type of affinities to increase efficient utilization of the fleet of network nodes.

FIG. 2 illustrates that the workflow engine relies upon workflow definitions with affinity policies 122. In embodiments, a workflow definition also includes an affinity policy. In embodiments, an affinity policy is represented via i) affinity policy type, ii) affinity policy value, and iii) affinity policy preference time-out.

In an example, each activity has one or more affinity policy preferences associated with it. These preferences may be ranged from the high preference to the low preference and may be specified as part of the workflow logic. In order to execute an activity from the workflow logic, the task router 204 of the workflow engine 120 routes the activity to a compute instance (e.g., activity execution node 220a) based upon the activity's first affinity policy preference statement. The activity may be executed in a containerized manner. In the example, if the activity is not scheduled on the assigned compute instance in the given affinity policy preference time-out period, then the workflow engine may again route the activity (e.g., this time to a different compute instance) based upon its second affinity policy preference statement, and so on. In embodiments, the workflow engine 120 may keep on re-iterating the affinity policy preference statements until either the activity is successfully scheduled on a compute instance, or the activity or workflow itself times out (e.g., in case, there is a timeout configured at activity level or at workflow level).

In embodiments, the efficiency of the workflow execution may be dependent upon the choices for affinity policy preferences. In some such embodiments, preferences (e.g., expressed as one or more statements) are crafted based upon consideration of the workflow topology, the activity data, the underlying hardware, and/or the business requirements such as latency, cost related with usage of resources, etc., in order to increase the efficiency of the service providers computer system.

Table 1 illustrates example characteristics of various types of policies that may be specified by the system (e.g., as part of the specification of the workflow definition). Other types of policies with more, different, or fewer characteristics are contemplated without departing from the scope of this disclosure.

TABLE 1

Affinity Policies

| Affinity Policy Type | Affinity Policy Description | Affinity Policy Value | Policy Preference Time-out |
| --- | --- | --- | --- |
| PARENT ACTIVITY AFFINITY | The current activity will be routed to the compute instance where the parent activity was executed. E.g., May be helpful in defining workflow topology-based affinity, where activity data is shared among different tasks/activities. | Parent Activity Identifier | V mills |
| COMPUTE INSTANCE GROUP AFFINITY | The current activity will be routed to a compute instance belonging to specified compute instance group. | Compute Instance Group Identifier | W mills |
| COMPUTE INSTANCE AFFINITY | The current activity will be routed to the specified compute instance. A special case of the compute instance group affinity. | Compute Instance Identifier | X mills |

TABLE 1-continued

Affinity Policies

| Affinity Policy Type | Affinity Policy Description | Affinity Policy Value | Policy Preference Time-out |
|---|---|---|---|
| CODE AFFINITY | The current activity will be routed to a compute instance already having required code in a cache local to that compute instance. | Container Name | Y mills |
| DEFAULT | The current activity can be routed to any compute instance. | None | Z mills |

Data Locality

FIG. 2 illustrates various caches (e.g., data cache 224a, code cache 225a) that are local to a node (e.g., activity execution node 220a) of the fleet. In embodiments, such caches may be used to keep the data for an activity (sometimes referred to as activity data, herein) near to the compute instance processing it so that an activity would have fast access to the required activity data. The activity data, from the execution of the activity, may be stored in remote storage (e.g., remote task data storage 134a), and it may also be added to the local memory of the compute instance (e.g., data cache 224a) depending upon available resources. One advantage of such storage may be that next time, when another activity, which needs to operate on the same activity data, is assigned to the same compute instance, data retrieval becomes faster because it removes the network traffic that is associated with retrieving the activity data. If the other activity is assigned to a different compute instance, then the activity data is fetched from the remote storage and it is also added to the local memory of the compute instance depending upon its available resources.

A similar implementation may be applied to reuse of code. For example, code needed by one activity may be stored in a local code cache (e.g., 225a) and tasks or activities that rely upon that same code may be routed to that same node to rely upon the locally-stored code, instead of sending the task or activity to some other node that might have to access the code over the network and unnecessarily tying up additional network resources.

Figure 3:
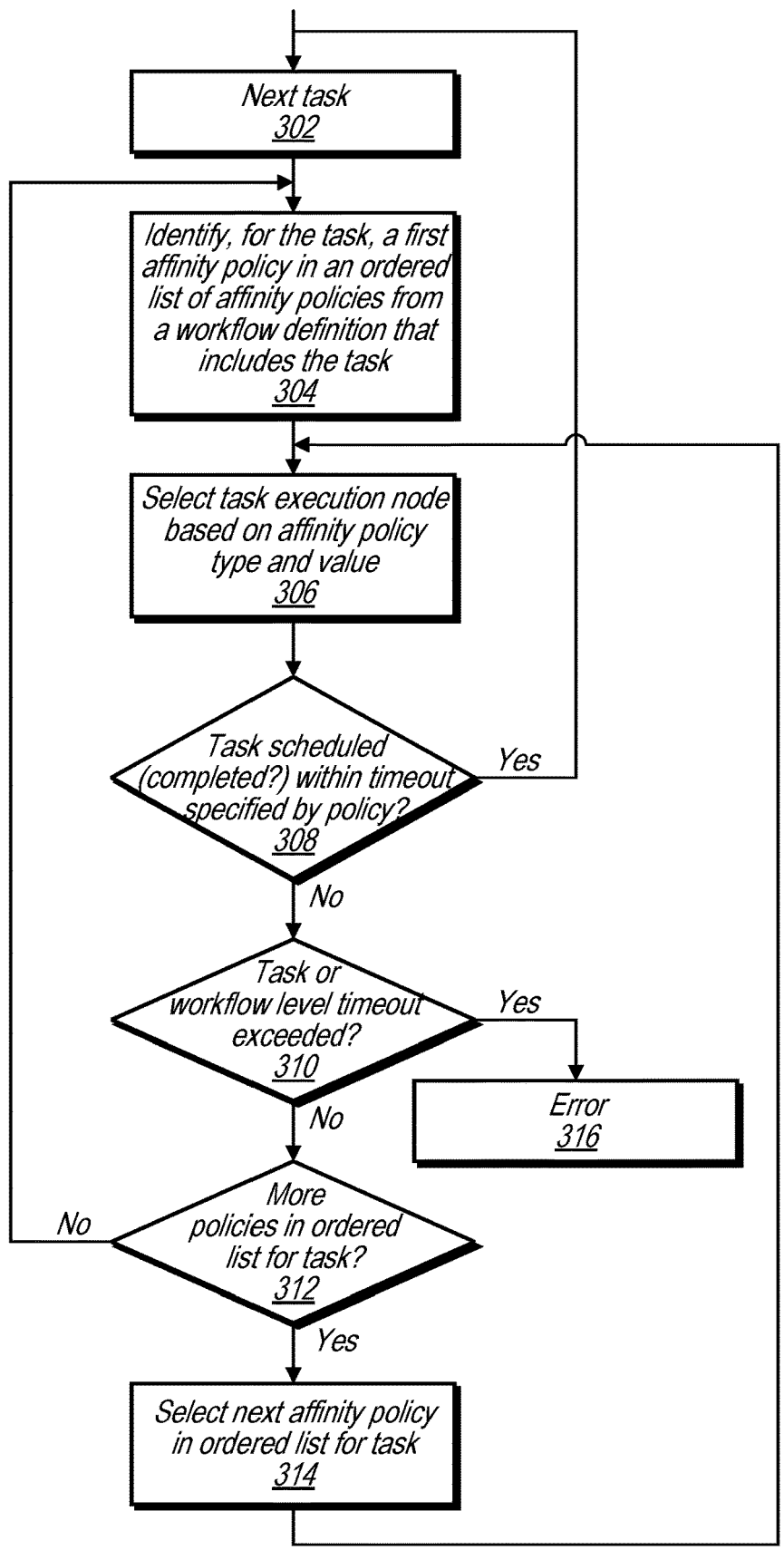
FIG. 3 is a flow diagram illustrating an affinity-based routing and execution technique performed by a workflow service, according to some implementations.

FIG. 3 is a flow diagram illustrating an affinity-based routing and execution technique performed by a workflow service, according to some implementations. The workflow service may receive a workflow definition from a client (not illustrated). As discussed above, the workflow definition may include (or otherwise be associated with) an affinity policy and may be specified in a domain specific language that describes a state machine for the workflow, including tasks, transitions, error handling, a terminating condition, among others.

Block 302 illustrates that a next task is determined. For example, workflow state tracker 202 may determine the next task using any of various techniques. A first affinity policy in an ordered list of affinity policies from a workflow definition that includes the task is identified, for the task (block 304). For instance, the affinity-based task route may identify the first affinity policy from the workflow definition for the workflow.

In addition to or instead of use of load balancing techniques for selecting a node, a task execution node is selected based on the affinity policy type and value (block 306). For example, the task router 204 may select an ancestral execution node based on an ancestral policy type and a parent activity identifier value.

In embodiments, timeouts may be used because a node may be determining (and indicating) that the node can do more tasks/activities but due to the multi-tenant architecture, almost any process may be running on that node, including processes that may take longer than a preferred timeout period.

For example, at block 308, a determination of whether the task has been scheduled (or completed, in some embodiments) within a timeout specified by the policy. For instance, the execution tracker may receive an acknowledgement from the node indicating whether task has been scheduled (or completed, in some embodiments), and may determine that the task was or was not scheduled within the timeout. If the task was schedule (or completed) (308, yes), the process may return back to determining the next task (block 302). Otherwise, (308, no) a determination may be made whether the task or workflow level timeout has been exceeded (block 310). For example, the task router 204 may determine whether the task or workflow level timeout has been exceeded. If so (block 316, yes) the workflow engine may issue an error (block 316). Otherwise, for a timeout that has not been exceeded (block 310, no) a determination may be made whether there are additional policies in the ordered list for the task (block 312). If not (block 312, no) the process may return to block 304 and identify the next affinity policy in the ordered list, and so on. If there are additional policies in the ordered list for the task (block 312, yes) the next affinity policy in the ordered list is selected for the task.

In some embodiments, there is an ordered list of affinity policy preferences, where each preference is made of multiple granular affinity policies. For example—both code and resource affinity policies are executed for a task, in embodiments.

In some embodiments, instead of a single decision point (block 310) the system may implement two or more decision points. For example, a first decision point that determines whether a workflow level timeout has been exceeded, and a second decision point that determines whether a task level timeout has been exceeded. If timeouts are exceeded, errors may be generated and/or the system may return to a previous point in the functionality, such as returning to block 302 and iterating, until the task or workflow has been completed, for example.

Figure 4:
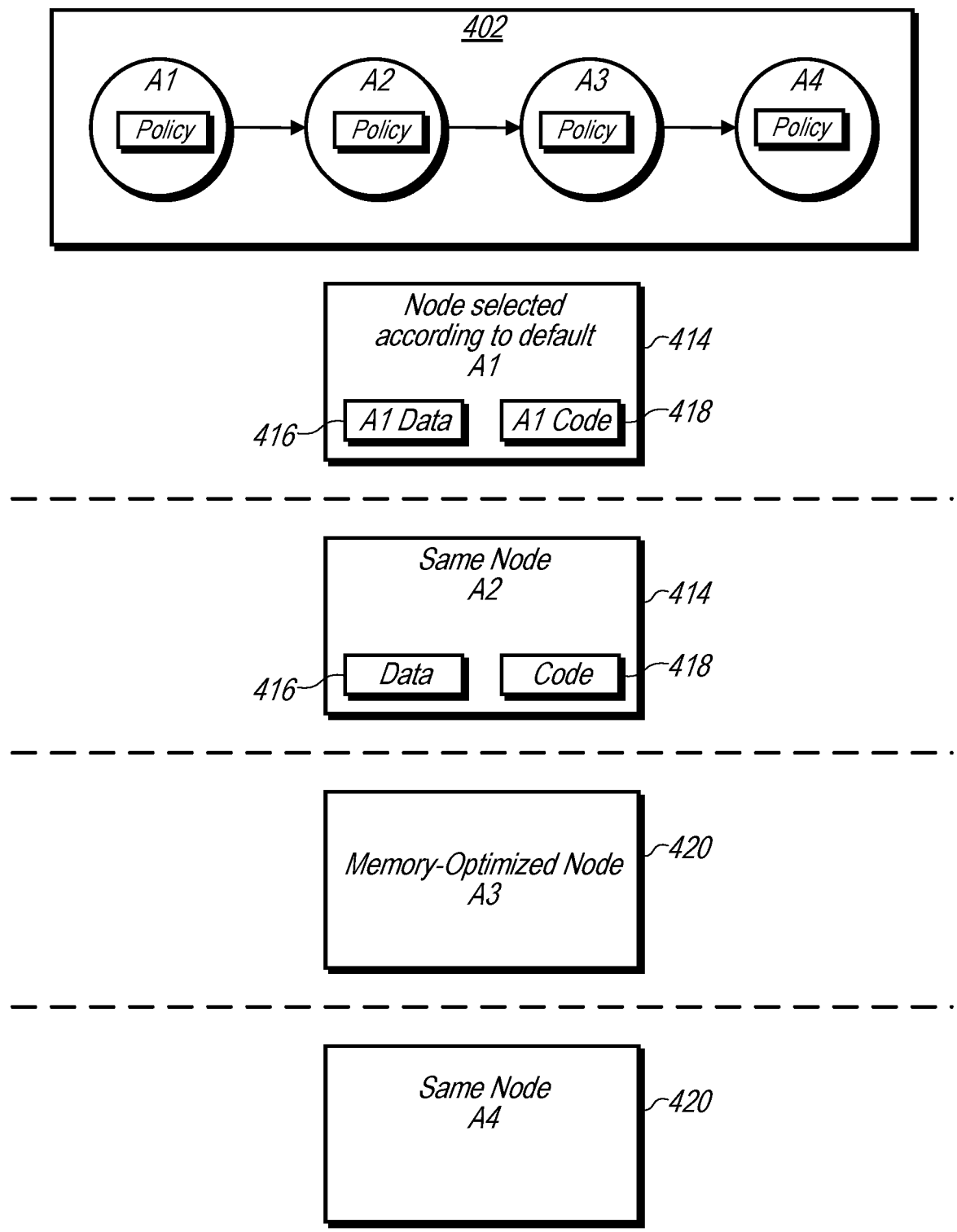
FIG. 4 depicts an example linear workflow and affinity policy preference configuration, according to some implementations.

FIG. 4 depicts an example linear workflow and affinity policy preference configuration, according to some implementations. In the illustrated embodiment, it is preferable to execute A3 on a memory-optimized compute instance and other activities on the same compute instance. An example affinity policy preferences configuration is as follows with example affinity policy statements for each of A1, A2, A3 and A4:

Activity A1: [(Affinity Type: DEFAULT, Affinity Value: None, Affinity Time-out: 5 seconds)]. Here, Activity A1 will be first preferred to be scheduled on any compute instance as per its first affinity policy preference. If A1 is still not scheduled in any compute instance within 5 second, then the first affinity policy preference is again selected. This will keep on happening until either A1 is successfully scheduled on a compute instance, or A1 or workflow itself times out. FIG. 4 depicts Activity A1 on the node 414 selected according to the default policy type, along with A1 data in data cache 416 and A1 code in code cache 418.

Activity A2: [(Affinity Type: PARENT, Affinity Value: A1, Affinity Time-out: 2 seconds). (Affinity Type: DEFAULT, Affinity Value: None, Affinity Time-out: 4 seconds)]. Here, Activity A2 will be first preferred to be scheduled on the same compute instance where A1 was executed. If A2 is not scheduled on the compute instance within 2 seconds based upon its first affinity policy preference, then A2 is scheduled on any compute instance based upon its second affinity policy preference. If A2 is still not scheduled on any compute instance within 4 seconds, its first affinity policy preference is again selected. This will keep on happening until either A2 is successfully scheduled on a compute instance, or A2 or the workflow itself times out. FIG. 4 depicts Activity A2 on the same node 414 selected according to the parent or ancestral policy type, along with data in data cache 416 and code in code cache 418. In embodiments, activity A2 is preferred to be scheduled on the same compute node instance as A1 because A2 uses data in data cache 416 from A1. Data in cache 416 may grow to include data from both A1 and A2 or may includes only data from A2 after A2 uses the A1 data. In embodiments, activity A2 is preferred to be scheduled on the same compute node instance as A1 because A2 uses code in code cache 418 from A1.

Activity A3: [(Affinity Type: COMPUTE_INSTANCE_GROUP_AFFINITY, Affinity Value: MEMORY-OPTIMIZED-COMPUTE-INSTANCE-GROUP—XXX, Affinity Time-out: 3 seconds), (Affinity Type: PARENT_ACTIVITY_AFFINITY, Affinity Value: A2, Affinity Time-out: 1 seconds), (Affinity Type: DEFAULT, Affinity Value: None, Affinity Time-out: 4 seconds)]. Here, the Activity A3 will be first preferred to be scheduled on a compute instance from a memory-optimized-compute-instance-group identified as xxx compute instance group based upon its first affinity policy preference (another example would be to run on a specialized graphics-processing resource). If A3 is not scheduled on the compute instance within 3 seconds based upon its first affinity policy preference, then A3 is scheduled on the same compute instance where A2 was executed based upon its second affinity policy preference. If A3 is still not scheduled on the compute instance within 1 seconds based upon its second affinity policy preference, then A3 is scheduled on any compute instance based upon its third affinity policy preference. If A3 is still not scheduled on any compute instance within 4 seconds based upon its third affinity policy preference, its first affinity policy preference is again selected. This will keep on happening until either A3 is successfully scheduled on a compute instance, or A3 or the workflow itself times out.

Activity A4: [(Affinity Type: PARENT_ACTIVITY_AFFINITY, Affinity Value: A3, Affinity Time-out: 1 seconds), (Affinity Type: DEFAULT, Affinity Time-out: 1s)]. FIG. 4 depicts Activity A4 on the same node 420 selected according to the parent or ancestral policy and with a value of A3.

Activity Executor Functionality

Figure 5:
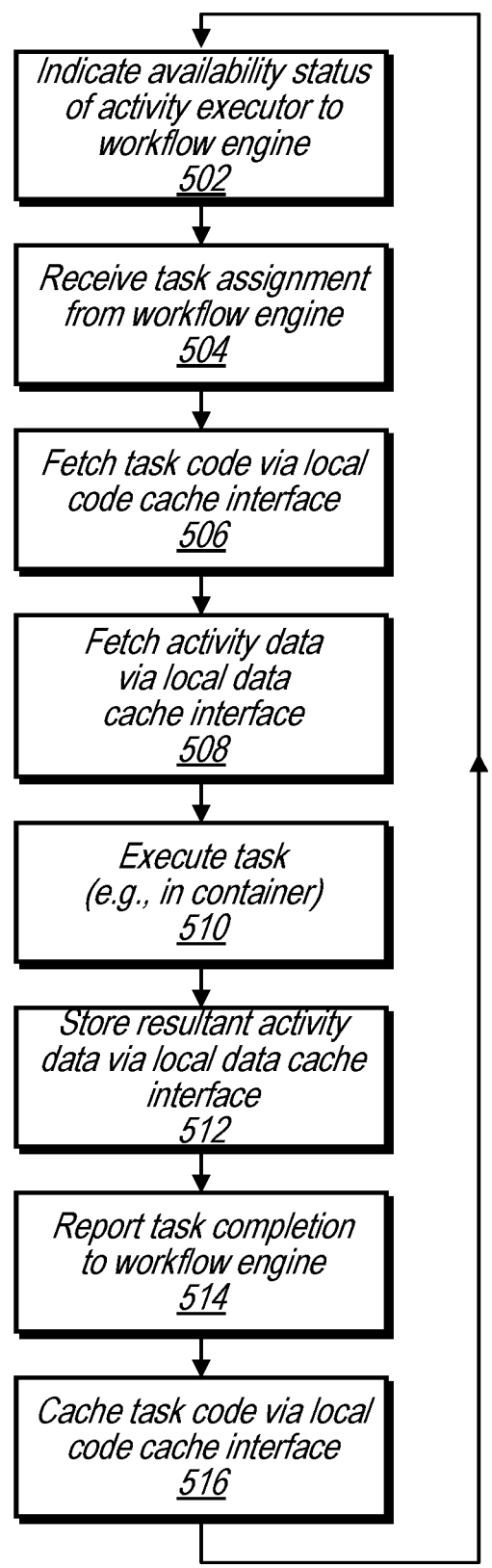
FIG. 5 is a flow diagram illustrating interactions between an activity executor, workflow engine and various caches, according to some implementations.

FIG. 5 is a flow diagram illustrating interactions between an activity executor, workflow engine and various caches, according to some implementations. The functionality depicted may be performed by one or more components illustrated in FIGS. 1 and 2, such as nodes 220a-n and the activity executor noes 222a-n, for example.

Availability status of the activity executor is indicated to the workflow engine (block 502). For example, activity executor 222a may self-report its own availability (e.g., based on whether computing resources of the node are above some threshold or based on some threshold number of tasks being performed at the activity executor) to execution node tracker 206. A task assignment is received from the workflow engine (block 504). For instance, activity executor 222a may receive a task assignment from affinity-based task router 204. Task code is fetched via local code cache interface (block 506), and the task is executed (block 510). For example, activity executor 222a may request task code from a local code cache interface (e.g., 608, described in FIG. 6) and execute the task in a container. Resultant activity may be stored via the local data cache interface (block 512) and task completion reported to the workflow engine (block 514). For instance, the activity executor may store the results of the activity to data cache 224a and report completion of the task to execution node tracker 206. Task code may be cached via local code cache interface (block 516), activity executor 222a may store the task code to code cache 225a (e.g., via cache interface 608, described in FIG. 6) for example.

In-Memory Cache Systems

Figure 6A:
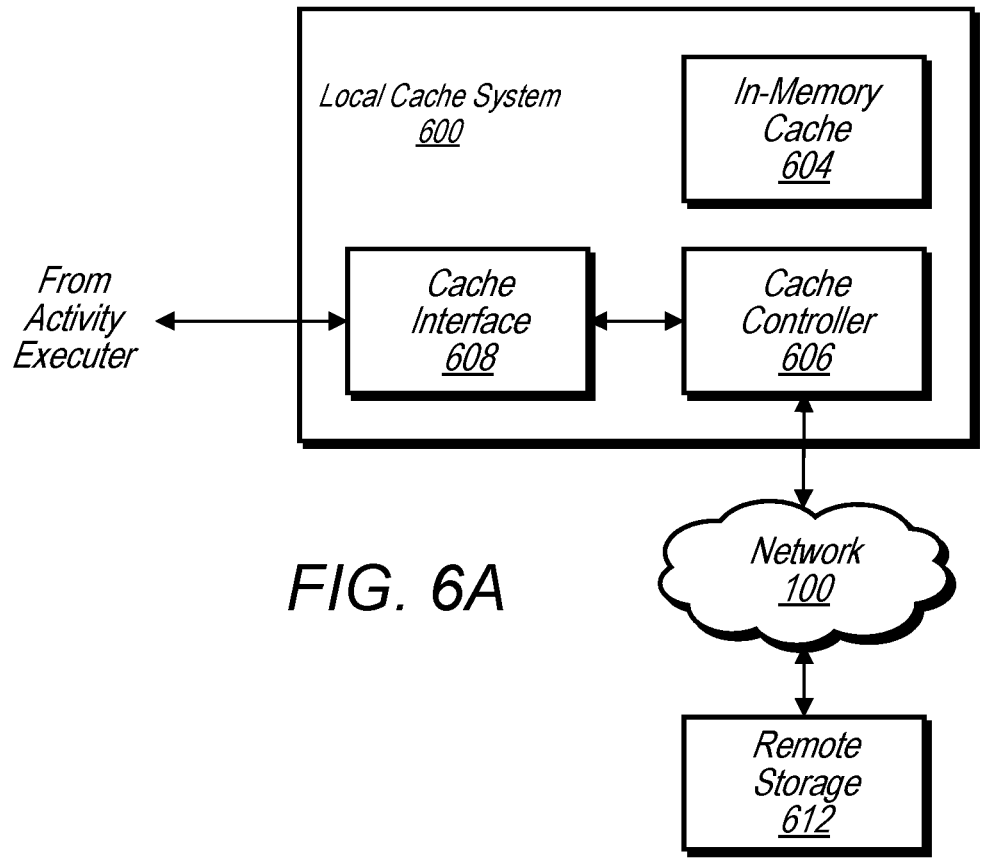
FIG. 6A is another illustrative architecture depicting an example local in-memory cache system, according to some implementations.
Figure 6B:
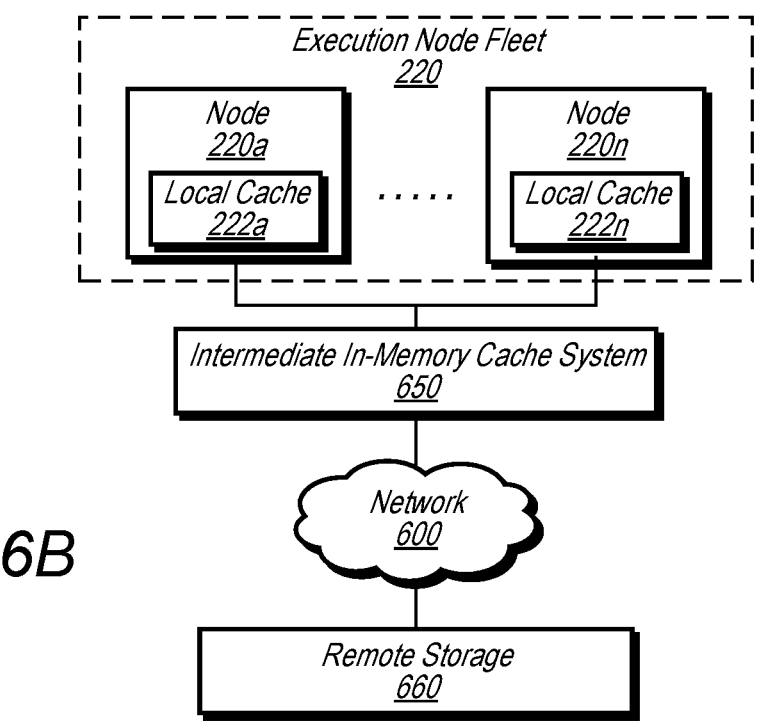
FIG. 6B is an illustrative architecture depicting an example implementation of a cache architecture within the context of an execution node fleet and an intermediate in-memory cache system, according to some implementations.

FIG. 6A is an illustrative architecture depicting an example local in-memory cache system, according to some implementations, and FIG. 6B is an illustrative architecture depicting an example implementation of a cache architecture within the context of an execution node fleet and an intermediate in-memory cache system, according to some implementations. One or more of the components illustrated in FIGS. 6A/6B may perform some or all of the functionality illustrated in FIGS. 7 and 8, in embodiments.

The local in-memory cache system 600 provides an interface to activity executor(s) for fetching input data and storing output data, in embodiments. At least the illustrated embodiment has following components: activity cache client interface 608, local in-memory cache 604, cache controller 606. In some embodiments, the local in-memory cache system provides access to remote storage over network 100.

The cache interface 608 may be implemented variously, for example as a thin layer client that provides an interface to activity executors for fetching and storing activity data. In at least one implementation it exposes the following two APIs: i) an API call that passes the activity data to activity cache controller which returns a unique reference key for that activity data, and ii) an API call that returns the activity data for the given key.

The local-to-the-node in-memory cache 604 is the compute instance specific local in-memory cache, and the remote storage 612 may be implemented as highly available, reliable, durable, and scalable data storage for storing the activity data.

The activity cache controller 606 may be responsible for interacting with activity cache client, storage, and in-memory cache. For example, for interaction with activity cache client, activity cache client interacts with the activity cache controller for storing and fetching activity data. For interaction with storage, activity cache controller interacts with the storage for storing and fetching the activity data.

The data handling with storage would vary depending upon the choice of storage and the infosec data handling requirements, in embodiments.

Example interaction with in-memory cache may include cache population, cache validity, and cache evictions. With regard to Cache Population, a combination of following two strategies may be used to populate the local cache: i. write-through cache in asynchronous manner, ii. lazy-loading cache in asynchronous manner For the write-through cache in asynchronous manner: 1. After the execution of an activity, its activity data is stored in the remote storage. 2. The activity data is added in the local in-memory cache in an asynchronous manner.

Example lazy-loading cache includes the following steps: 1. When the activity container needs to fetch the activity data from the remote storage, it checks the local in-memory cache first to determine whether the activity data is available. If the activity data is available (a cache hit), the cached activity data is returned to the activity container. 2. If the activity data isn't available (a cache miss), then the activity data is fetched from the storage, and the data is returned to the activity container. 3. The activity data is added to the local in-memory cache in an asynchronous manner.

At least some of the advantages of using a combination of these two above mentioned approaches may include: 1. The cache contains only activity data that the activity container actually touches, which helps keep the cache size cost effective. 2. Because the cache is up to date with the storage, there is a much greater likelihood that the data will be found in the cache. This, in turn, results in better overall application performance. 3. The performance of storage is optimal because fewer storage reads are performed.

Cache Validity

In embodiments, once an activity data is generated, it is immutable and is not updated. However, since this activity data is temporary and it is associated with only a particular workflow execution instance, it is deleted from both local cache and remote storage as well by applying a time to live (TTL) or expiration.

In embodiments, the activity data in the remote storage needs to have a larger TTL compare to the activity data in the local in-memory cache. This is because when a failed or timed-out activity from a workflow execution is retried later, it could still access the corresponding activity data from the remote storage.

Cache Evictions

In embodiments, two cache eviction policies are used for deleting the activity data from local cache—I. Duration-based Cache Eviction—The activity data is deleted from the local cache by applying a TTL or expiration. II. Memory-based Cache Eviction—The activity data is deleted from the local cache when the cache memory is overfilled or is greater than the max memory setting for the cache. The cache evicts the least recently used (LRU) regardless of TTL set.

FIG. 6B is an illustrative architecture depicting an example implementation of a cache architecture within the context of an execution node fleet and an intermediate in-memory cache system, according to some implementations. Examples of intermediate in-memory cache systems include in-memory data storage systems include Memcached (e.g., a high-performance distributed memory cache service, and Redis (e.g., an open-source key-value store). Similar to Memcached, Redis stores most of the data in the memory. It supports operations on various data types including strings, hash tables, and linked lists among others, for example. Other intermediate in-memory cache systems are contemplated without departing from the scope of this disclosure. Activity execution nodes 220a-220n are illustrated as part of a fleet of activity execution nodes 220. In some embodiments, nodes 220a-n may be nodes of virtual computing service 130. In some embodiments, nodes 220a-n may be implemented by an even-based computing service 132. Intermediate in-memory cache system 650 is depicted. Remote storage 160 is illustrated as available over network 100 and may take any form including a highly-available, reliable, durable, and scalable data storage that is remote from the nodes. Remote storage 160 may be implemented via storage service 134, in embodiments. Activities or tasks executing on the activity execution nodes 220a-220n may obtain data from and store data to intermediate in-memory cache system 650, such as activity data, code, etc.

In embodiments, the activity executor 222a-n obtains data from or send data to an intermediate in-memory cache system 650 (e.g., via the activity cache client for fetching the necessary activity data, or via another API or other type of interface, or the like, etc.). The activity executor may pass the output to the intermediate in-memory cache system, and/or publishes the results to the workflow executor that the activity has been completed. In embodiments, the activity executor will conditionally assign the necessary permissions to a container. By default, all external access is blocked from the container to enforce security, in some embodiments.

In embodiments, intermediate cache affinity may indicate that required data or code required for a workflow task may be present in an intermediate cache (e.g., near-to, outside of, or otherwise associated with a cluster of nodes, or the like). For example, a preference policy or statement that indicates intermediate cache affinity may cause the system to select a node that is close to another node associated with (or that is part of a cluster close to or otherwise associated with) an intermediate cache that already has activity data or task code required by the task or activity.

Figure 7:
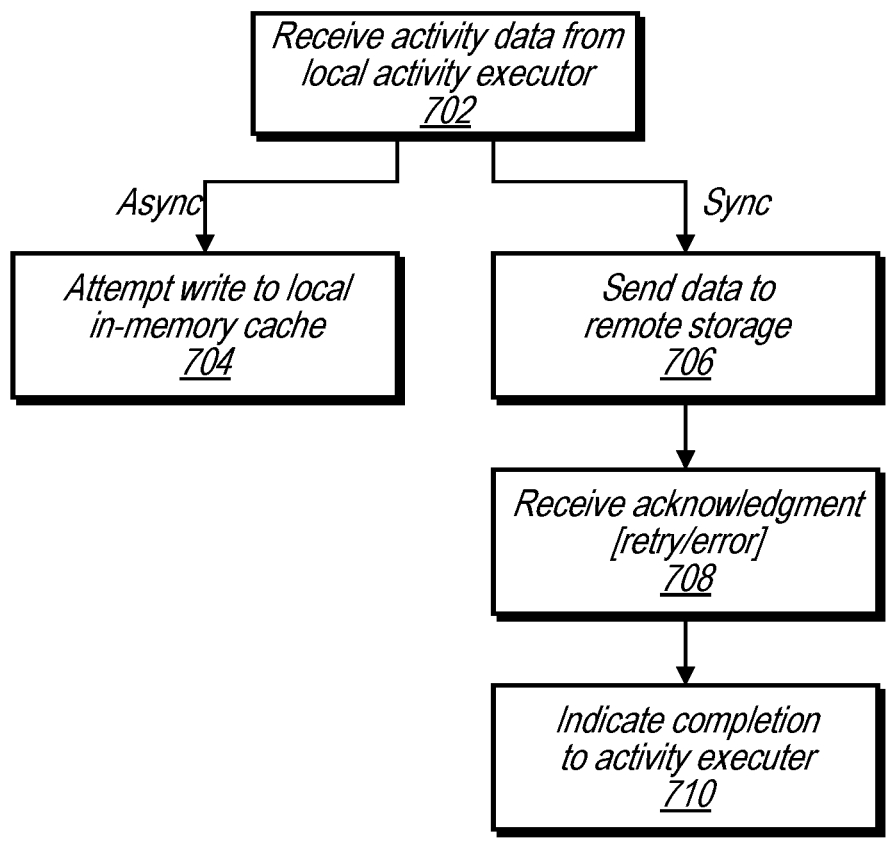
FIG. 7 is a flow diagram illustrating example functionality of an in-memory cache system that receives activity data, according to some implementations.

FIG. 7 is a flow diagram illustrating example functionality of an in-memory cache system that receives activity data, according to some implementations. The logical functionality illustrated in FIG. 7 may be performed by one or more components of the in-memory cache systems 600/650, in embodiments.

At block 702, activity data from a local activity executor is received. For example, cache interface 608 receives activity data from execution of an activity by activity executor 222a in activity execution node 220a in FIG. 2. A write to local in-memory cache is attempted (block 704). For example, cache controller 606 may attempt to write the data to in-memory cache 604. This functionality may be performed in either a synchronous or in an asynchronous manner with respect to the receipt of the activity data (e.g., the local in-memory cache 604 may or may not have space available, so it may not be relied on like the remote storage, which can be counted on as always available).

At block 706, data is sent to the remote storage, for example, cache controller 606 may send the data to remote storage 612 over network 100. This process may be performed in either a synchronous or asynchronous manner with receipt of the data as the remote storage is relied upon to be the more reliable storage. For example, after the data is sent to the remote storage (706), the cache controller may wait to receive an acknowledgement from the remote storage (block 708). If the data was unable to be stored, the cache controller may retry sending the data or may issue an error. When an acknowledgement of successful storage of the data is received, the cache controller may indicate completion to the activity executor from which the data was received (block 710).

Figure 8:
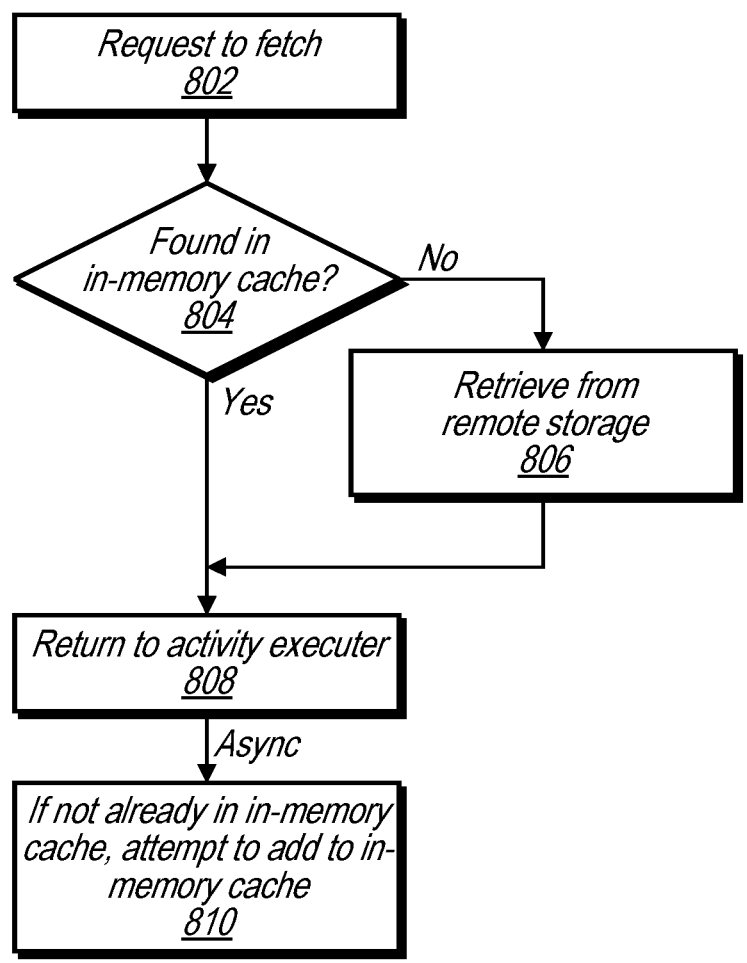
FIG. 8 is a flow diagram illustrating example functionality of an in-memory cache system that receives a request to fetch, according to some implementations.

FIG. 8 is a flow diagram illustrating example functionality of an in-memory cache system that receives a request to fetch, according to some implementations. The logical functionality illustrated in FIG. 8 may be performed by one or more components of the various in-memory cache systems 600/650, in embodiments.

At block 802, a request to fetch is received. For example, cache interface 608 may receive a request from an activity executor 222 to fetch activity data or task code. At 804 a determination is made whether the requested data is found in an in-memory cache. For example, cache controller 606 queries in-memory cache 604 for the requested activity data or task code. If the data is not found (804, no) the data is retrieved from remote storage (block 806) and returned to the activity executor (block 806). If the data is found (804, yes) the data is returned to the activity executor (block 806). At block 810, if the data was not already in the in-memory cache (e.g., in-memory cache 604), the cache controller 606 attempts to add the data to the in-memory cache (e.g., in-memory cache 604).

Use Cases

An example use of the disclosed affinity-based routing and execution for workflow service includes an automated document processing workflow that processes documents and images to improve the quality of the documents, determines the type of document, and then extracts structured semantic information from the documents (parts of which may be performed in parallel. In some such systems, the data passed between activities is large (and is also classified sensitive, hence it would be required to use a durable, available, reliable and secure storage for storing this data, and keys would be passed between activities rather than the actual data). In such an example, activities would interact with the storage for storing or fetching the required data. Whereas this would be great from the scaling perspective, the execution of these activities in this manner would incur additional latency since now every activity would need to fetch or store the required data over the network every time.

Additionally, certain activities should be executed on certain types of compute instances for the accelerated performance. For example—GPU resources needed to accelerate the performance of the activities which are using image processing techniques or machine learning techniques. Some of these activities are common across extraction approaches.

Each activity would have affinity policy preferences driven by the workflow topology and the nature of the activity. These preferences are sued for scheduling the activity on a specific compute instance, in some embodiments.

Since the activity data is kept in the local memory and in the remote storage as well, it would be possible to re-use activities that are common across extraction approaches, as describe herein, in embodiments.

An activity could have all its dependencies bundled up in its container which would make the addition of an activity (or, even a component) in the extraction workflow graph easy, in embodiments.

In another example use case, an automated document screening mechanism supports forgery detection. The system runs various screening checks on the document in order to do forgery detection. When a document is submitted for screening, it first attempts to identify the document type. If the match is successful, the corresponding document template, which contains the layout details of the information present in the document, is fetched and used to extract the regions, where a region is a portion of the document needed to perform a screening check. These regions are passed to multiple screening checks and the result of analysis are obtained. Here, the forgery detection job could be represented as a workflow. The individual steps (such as document template identification step, document regions extraction step, various screening checks, and result analyzer step) could be represented as individual activities in the workflow.

In another example use case, a periphery system works in tandem with other services and enables the clients of those services to transform the documents stored over the other services. The system would retrieve the documents from other services, perform the requested transformation and upload the results back to the other services.

Figure 9:
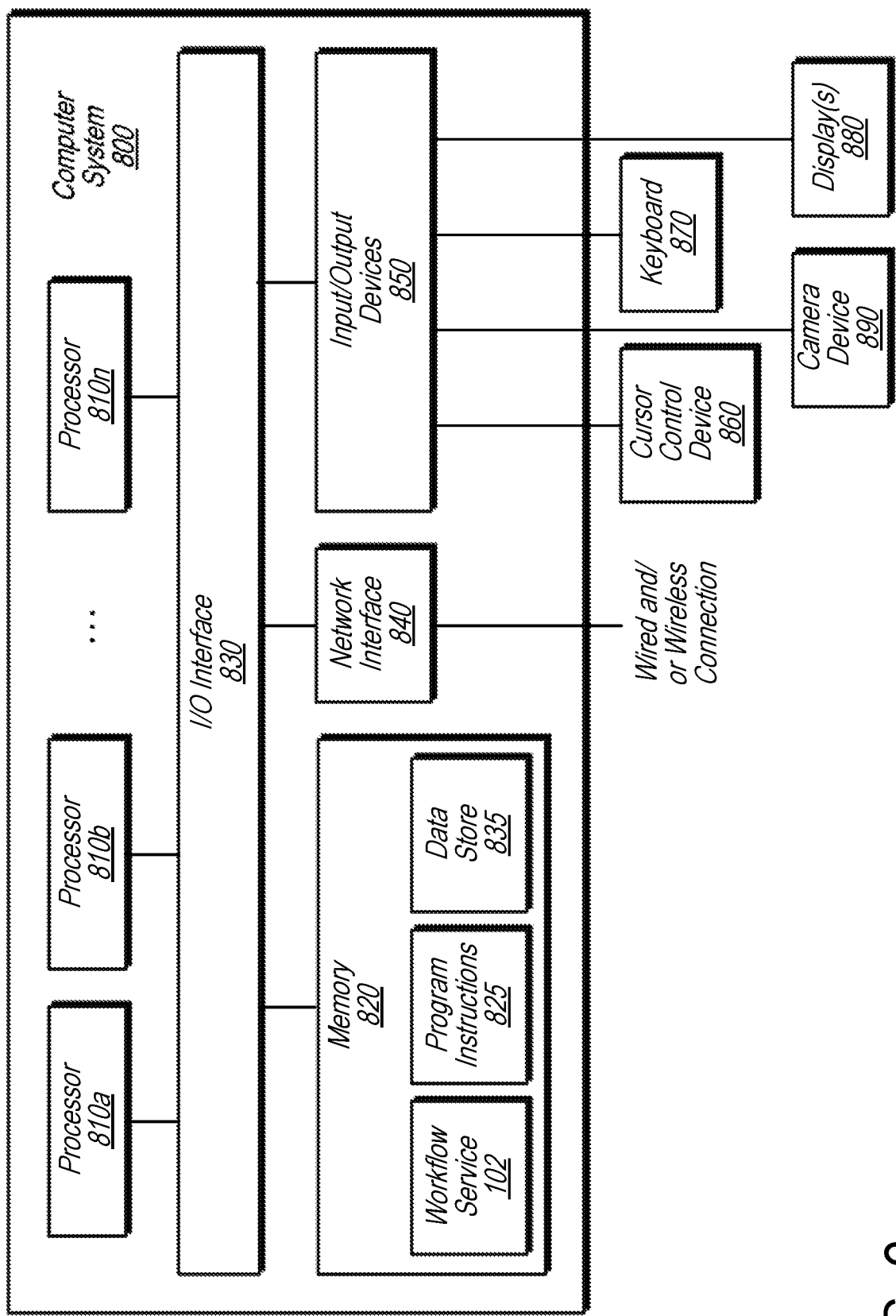
FIG. 9 illustrates a computer system including an implementation of a workflow service according to some implementations.

FIG. 9 illustrates an example computer system, computer system 900, where computer system 900 may be configured to implement different workflow service implementations, according to the discussed embodiments and examples. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device. Generally, the methods described herein may in various embodiments be implemented by any combination of hardware and software.

Further, the methods described herein may in various embodiments be implemented by any combination of hardware and software. For example, the methods may be implemented by computer system 900 that includes one or more processors executing program instructions stored on a computer-readable storage medium coupled to the processors. The program instructions may be configured to implement the functionality described herein (e.g., the functionality of various servers and other components that implement the affinity-based routing and execution for workflow service described herein). The various methods as illustrated in the figures and described herein represent example embodiments of methods. The order of any method may be changed, and various elements may be added, reordered, combined, omitted, or modified.

Computer system 900 includes one or more processors 910*a*-910*n* (any of which may include multiple cores, which may be single or multi-threaded) coupled to a system memory 920 via an input/output (I/O) interface 930. Computer system 900 further includes a network interface 940 coupled to I/O interface 930. In various embodiments, computer system 900 may be a uniprocessor system including one processor, or a multiprocessor system including several processors (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA. The computer system 900 also includes one or more network communication devices (e.g., network interface 940) for communicating with other systems and/or components over a communications network (e.g. Internet, LAN, etc.). For example, a client application executing on system 900 may use network interface 640 to communicate with a server application executing on a single server or on a cluster of servers that implement one or more of the components of the systems described herein. In another example, an instance of a server application executing on computer system 900 may use network interface 940 to communicate with other instances of the server application (or another server application) that may be implemented on other computer systems. Further, computer system 900, via I/O interface 930, may be coupled to one or more input/output devices 950, such as cursor control device 960, keyboard 970, camera device 990, and one or more displays 980.

In the illustrated embodiment, computer system 900 also includes one or more persistent storage devices and/or one or more I/O devices 950. In various embodiments, persistent storage devices may correspond to disk drives, tape drives, solid state memory, other mass storage devices, or any other persistent storage device. Computer system 900 (or a distributed application or operating system operating thereon) may store instructions and/or data in persistent storage devices, as desired, and may retrieve the stored instruction and/or data as needed. For example, in some embodiments, computer system 900 may host a storage system server node, and persistent storage may include the SSDs attached to that server node.

Computer system 900 includes one or more system memories 920 that are configured to store instructions and data accessible by processor(s) 910. In various embodiments, system memories 920 may be implemented using any suitable memory technology, (e.g., one or more of cache, static random-access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 920 may contain program instructions 925 that are executable by processor(s) 910 to implement the methods and techniques described herein. In various embodiments, program instructions 925 may be encoded in native binary, any interpreted language such as Java™ bytecode, or in any other language such as C/C++, Java™, etc., or in any combination thereof. For example, in the illustrated embodiment, program instructions 925 include program instructions executable to implement the functionality of a database service, tracking-enabled client, update tracker, update listener, and/or update consumer in different embodiments. In some embodiments, program instructions 925 may implement multiple separate clients, server nodes, and/or other components.

In some embodiments, program instructions 925 may include instructions executable to implement an operating system (not shown), which may be any of various operating systems, such as UNIX, LINUX, Solaris™, MacOS™, Windows™, etc. Any or all of program instructions 925 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 900 via I/O interface 630. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 940.

In some embodiments, system memory 920 may include data store 935, which may be configured as described herein. In general, system memory 820 (e.g., data store 835 within system memory 820), persistent storage, and/or remote storage may store data blocks, replicas of data blocks, metadata associated with data blocks and/or their state, configuration information, and/or any other information usable in implementing the methods and techniques described herein. Further, data store 820 may include modules for implementing affinity-based routing and execution for workflow service.

In one embodiment, I/O interface 930 may be configured to coordinate I/O traffic between processor(s) 910, system memory 920 and any peripheral devices in the system, including through network interface 940 or other peripheral interfaces. In some embodiments, I/O interface 930 may perform any necessary protocol, timing or other data transformations to convert data signals from one component (e.g., system memory 920) into a format suitable for use by another component (e.g., processor(s) 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor(s) 910.

Network interface 940 may be configured to allow data to be exchanged between computer system 900 and other devices attached to a network, such as other computer systems (which may implement one or more storage system server nodes, database engine head nodes, and/or clients of the database systems described herein), for example. In addition, network interface 940 may be configured to allow communication between computer system 900 and various I/O devices 950 and/or remote storage. Input/output devices 950 may, in some embodiments, include one or more display terminals, keyboards, keypads, touchpads, scanning devices, voice or optical recognition devices, or any other devices suitable for entering or retrieving data by one or more computer systems 900. Multiple input/output devices 950 may be present in computer system 900 or may be distributed on various nodes of a distributed system that includes computer system 900. In some embodiments, similar input/output devices may be separate from computer system 900 and may interact with one or more nodes of a distributed system that includes computer system 900 through a wired or wireless connection, such as over network interface 940. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet networks, for example. Additionally, network interface 940 may support communication via telecommunications/telephony networks such as analog voice networks or digital fiber communications networks, via storage area networks such as Fibre Channel SANs, or via any other suitable type of network and/or protocol. In various embodiments, computer system 900 may include more, fewer, or different components than those illustrated (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a plurality of computers configured to implement a fleet of workflow activity execution nodes; and
one or computers configured to implement a workflow engine configured to manage execution of workflows according to workflow definitions that specify a flow of a plurality of different tasks and one or more affinity policies for one or more of the different tasks, wherein the workflow engine comprises:
an execution node tracker implemented via one or more processors and memory and configured to track configuration information for workflow activity execution nodes, including:
identifiers of task execution code locally stored on individual workflow activity execution nodes, and
resource capability information for individual workflow activity execution nodes; and
a task router implemented via one or more processors and memory and configured to:
identify, for a task of a workflow, an affinity policy from a workflow definition that includes the task;
select, based at least in part on the affinity policy and the configuration information from the execution node tracker, one of the workflow activity execution nodes to execute the task, where the affinity policy indicates one or more of:
a parent activity affinity that indicates that the task should be routed to a workflow activity execution node that executed a specified previous task of the workflow,
a resource group affinity that indicates that the task should be routed to a workflow activity execution node having a specified resource capability, or
a code affinity that indicates that the task should be routed to a workflow activity execution node having code for a specified task execution code identifier; and
route the task to the selected workflow activity execution node.

2. The system of claim 1, wherein:
the affinity policy comprises an ordered list of affinity policy statements;
individual affinity policy statements include a timeout value; and
the task router is configured to:
attempt to route a given one of the tasks according to a first affinity policy statement in the ordered list, and
in response to the given task not being scheduled within specified timeout, attempt to route the given task according to a next affinity policy statement in the ordered list.

3. The system of claim 1, further comprising a workflow definition data store that comprises a plurality of workflow definitions with corresponding affinity policies, at least one of which is a default affinity policy that indicates that one or more tasks corresponding to the default affinity policy can be routed to any node in the fleet.

4. The system of claim 1,
further comprising a cache, local to the selected workflow activity execution node that stores activity data from execution of a previous task, the activity data from the previous task needed by the task;

wherein:
the affinity policy indicates the parent activity affinity that indicates that the task should be routed to the workflow activity execution node that executed the previous task;
the task router is configured to route the task to the selected workflow activity execution node; and
the selected workflow activity execution node executes the task using the activity data in the local cache from the previous task.

5. The system of claim 1, further comprising:
an activity executor of the workflow activity execution node; and
an in-memory cache system comprising:
a cache interface, and
a cache controller for a cache that is local to the selected workflow activity execution node and that stores activity data from execution of tasks, the cache controller implemented via one or more processors and memory and configured to:
receive activity data from the activity executor of the workflow activity execution node;
attempt to write the received activity data to the local cache;
send the received activity data to remote storage;
receive an acknowledgement from the remote storage for the activity data; and
indicate completion of task to the activity executor.

6. The system of claim 1, further comprising:
an activity executor of the workflow activity execution node; and
an in-memory cache system comprising:
a cache interface, and
a cache controller for a cache that is local to the selected workflow activity execution node and that stores activity data from execution of tasks, the cache controller implemented via one or more processors and memory and configured to:
receive a request from the activity executor to fetch activity data or task code,
retrieve the requested activity data or task code from a local in-memory cache or from remote storage,
return the requested activity data or task code to the activity executor, and
if the requested activity data or task code was not already in the in-memory cache, attempt to add the requested activity data or task code to the in-memory cache.

7. A method, comprising:
identifying, for a task of a workflow, a policy from a workflow definition including the task, the policy indicating one or more of:
a parent activity affinity indicating that the task should be routed to an activity execution node that executed a specified previous task of the workflow,
a resource group affinity indicating that the task should be routed to an activity execution node having a specified resource capability, or
a code affinity indicating that the task should be routed to an activity execution node having code for a specified task execution code identifier;
selecting one of a fleet of activity execution nodes to execute the task based at least in part on the affinity type indicated by the policy, and configuration information comprising:
identifiers of task execution code locally stored on individual activity execution nodes, and
information for individual activity execution nodes that indicates resource capability; and
routing the task to the selected activity execution node.

8. The method of claim 7, wherein:
the policy comprises an ordered list of affinity policy statements, individual affinity policy statements including a timeout value; and
the method further comprises:
attempting to route a given one of the tasks according to a first affinity policy statement in the ordered list, and
responsive to the given task not being scheduled within specified timeout, attempting to route the given task according to a next affinity policy statement in the ordered list.

9. The method of claim 7, further comprising:
analyzing a workflow definition that does not include an affinity policy to determine one or more policies; and
adding the determined one or more policies to one or more tasks within the workflow definition.

10. The method of claim 9, wherein said analyzing the workflow definition includes:
generating a machine-learning model;
training the machine-learning model on a data set; and
applying the trained machine-learning model to the workflow definition to determine the one or more policies.

11. The method of claim 7, further comprising:
receiving, by an activity executor of the selected activity execution node from a workflow engine, the task;
fetching task code via local code cache interface;
fetching activity data via local data cache interface;
executing the task;
storing resultant activity data via the local data cache interface;
reporting task completion to the workflow engine; and
caching the task code via the local code cache interface.

12. The method of claim 7, further comprising:
receiving, by a local cache controller that is local to the selected activity execution node, activity data from the selected activity execution node;
sending a request to store the activity data at an intermediate in-memory cache system;
receiving an acknowledgement of the request from the intermediate in-memory cache system; and
indicating completion of storage of activity data to an activity executor of the selected activity execution node.

13. The method of claim 7, wherein said identifying, said selecting, and said routing are performed as a service by one or computers of a multi-tenant service provider.

14. The method of claim 7, further comprising:
storing, prior to said selecting the activity execution node, code required for execution of a previous task to a cache that is local to the activity execution node;
wherein the policy indicates the code affinity that indicates that the task should be routed to the activity execution node having code for a specified task execution code identifier;
routing the task to the selected activity execution node; and
executing, by the selected activity execution node, the task using the required code stored to the local cache for the previous task.

15. The method of claim 7, further comprising:
routing another task to another workflow activity execution node according to a default affinity policy that indicates that one or more tasks corresponding to the default affinity policy can be routed to any node in the fleet.

16. The method of claim 7, further comprising:
receiving, from a workflow activity execution node, an availability status of the workflow activity execution node that indicates the workflow activity execution node is available;
sending a task assignment to the available workflow activity execution node; and
receiving an indication of completion of the task from the available workflow activity execution node.

17. One or more non-transitory, computer-readable storage media storing program instructions that when executed on or across one or more hardware processors configure a workflow service to perform:
identifying, for a task of a workflow, a policy from a workflow definition including the task, the policy indicating one or more of:
a parent activity affinity indicating that the task should be routed to an activity execution node that executed a specified previous task of the workflow,
a resource group affinity indicating that the task should be routed to an activity execution node having a specified resource capability, or
a code affinity indicating that the task should be routed to an activity execution node having code for a specified task execution code identifier;
selecting one of a fleet of activity execution nodes to execute the task based at least in part on the affinity type indicated by the policy, and configuration information comprising:
identifiers of task execution code locally stored on individual activity execution nodes, and
information for individual activity execution nodes that indicates resource capability; and
routing the task to the selected activity execution node.

18. The one or more non-transitory, computer-readable storage media of claim 17, wherein:
the policy comprises an ordered list of affinity policy statements, individual affinity policy statements including a timeout value; and
the instructions cause the one or more hardware processors to perform:
attempting to route a given one of the tasks according to a first affinity policy statement in the ordered list, and
attempting, responsive to the given task not being scheduled within specified timeout, to route the given task according to a next affinity policy statement in the ordered list.

19. The one or more non-transitory, computer-readable storage media of claim 17, wherein the instructions cause the one or more hardware processors to perform:
analyzing a workflow definition that does not include an affinity policy to determine one or more policies; and
adding the determined one or more policies to one or more tasks within the workflow definition.

20. The one or more non-transitory, computer-readable storage media of claim 17, wherein the instructions cause the one or more hardware processors to perform:
routing another task to another workflow activity execution node according to a default affinity policy that indicates that one or more tasks corresponding to the default affinity policy can be routed to any node in the fleet.

* * * * *